Dec. 2, 1952
U. TORRICELLI
2,619,956
REFLEX ACTION MEASURING DEVICE
Filed June 29, 1951
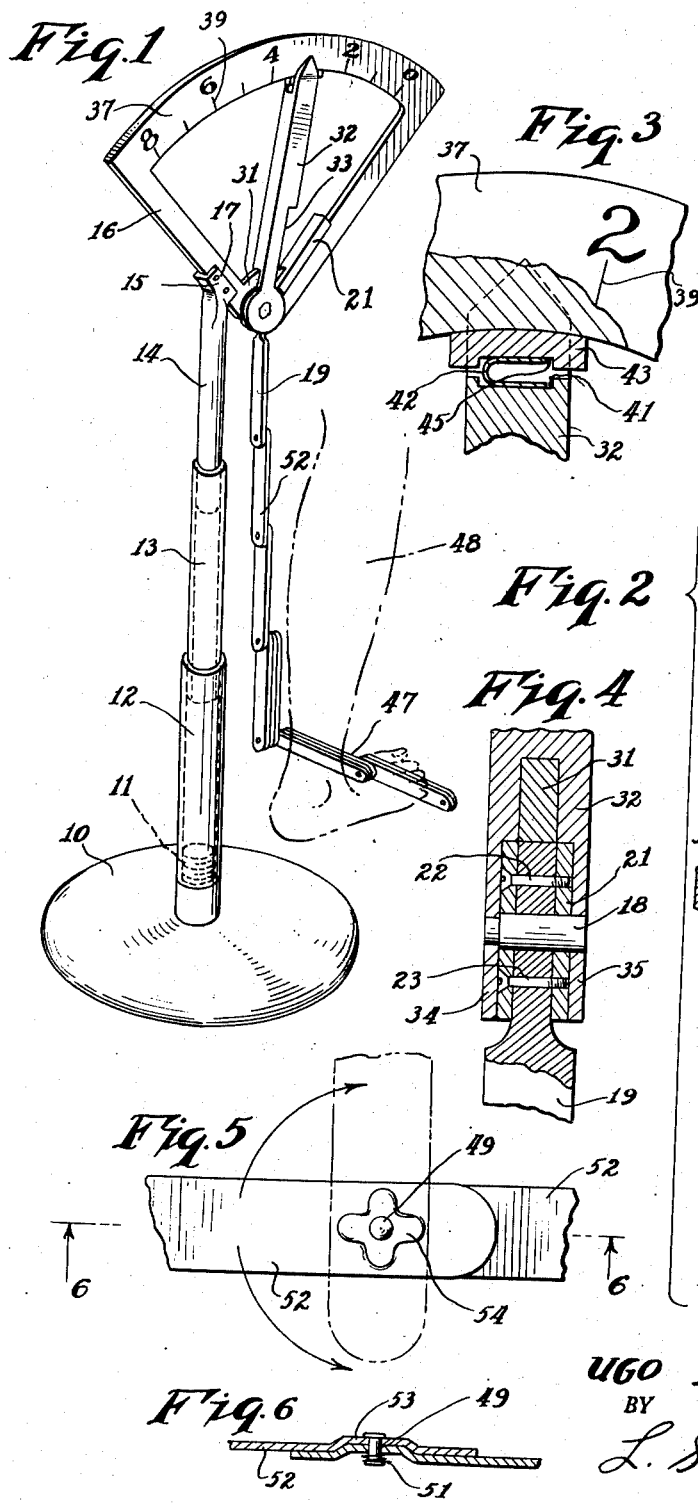
INVENTOR.
UGO TORRICELLI
BY
L. S. Saulsbury
his ATTORNEY Patented Dec. 2, 1952

2,619,956

UNITED STATES PATENT OFFICE 2,619,956

REFLEX ACTION MEASURING DEVICE

Ugo Torricelli, New York, N. Y., assignor to Torricelli Creations, Inc., New York, N. Y., a corporation of New York Application June 29, 1951, Serial No. 234,397

7 Claims. (Cl. 128—2)

This invention relates to a device for measuring the reflex actions of the limbs of humans.

It is an object of the invention to provide a measuring device adapted to receive the end of a limb of a human so that the amount of deflection of that limb can be indicated or recorded upon a graduated scale, forming a part of the device.

It is another object of the invention to provide a measuring device for the reflex actions of the limbs of the human body which is adjustable to different elevations for differing limb lengths and wherein an arm, engaging with the end of the limb, is adjustable by a simple procedure and wherein in effecting the adjustment of the various parts of the device, adjusting screws and handles are unnecessary.

Other objects of the invention are to provide a device for measuring the reflex actions of human limbs with the above objects in mind, which is of simple construction, inexpensive to manufacture, has a minimum number of parts, is compact, is easy to collapse and to extend, and is accurate and efficient in use.

For other objects and advantages and for a better understanding of the invention, reference may be had to the following detailed description taken in connection with the accompanying drawing, in which:

Fig. 1 is a perspective view of a measuring device embodying the features of the present invention.

Fig. 2 is a fragmentary, collective and perspective view of certain parts of the device.

Fig. 3 is an enlarged fragmentary view of the measuring arm and segment assembly and as viewed generally on line 3—3 of Fig. 2 where the parts shown in Fig. 2 are joined together.

Fig. 4 is an enlarged fragmentary sectional view taken through the pivot connection of the arm and the segment and as viewed generally along line 4—4 of the parts shown in Fig. 2 were these parts to be assembled.

Fig. 5 is a fragmentary elevational view of the extendable arm parts, and

Fig. 6 is a longitudinal sectional view taken on line 6—6 of Fig. 5.

Referring now to the drawing, 10 represents a pedestal base, having an upstanding threaded projection 11 and a sleeve 12 is threaded upon the threaded projection 11. Other sleeves of increasingly smaller diameters and indicated, respectively, at 13 and 14 are telescopically connected with one another and with the sleeve 12 whereby the assembly of sleeves can be extended or retracted to different elevations so that the device can be properly aligned with the limb of the patient.

The upper end of the sleeve 14 has an inclined bracket formation 15 to which an open segment 16 is attached by rivets 17.

In the lower end of the segment 16 there is a pivot pin 18 which supports an arm member 19 depending from the segment and which has rigidly fixed to the same an upstanding short arm 21. These arms are fastened together by screws 22 and 23 entering respectively openings 24 and 25 of the arms. Bifurcated disc portions 26 and 27 are provided on the short arm 21, Fig. 2, and the space therebetween receives disc portion 28 of the arm 19. The holes 24 are provided in the disc portions 26 and 27 of the short arm 21 and the holes 25 are provided in the portion 26 of the depending arm 19 for the purpose described.

The segment 16 has at its lower end an arcuate portion 31 over which indicating arm 32 rides. The indicating arm 32 is recessed at 33 along one side to receive the short arm 21, and is bifurcated to provide spaced ring projections 34 and 35. The pivot pin 18 extends through these projections 34 and 35 and serves as a pivot on which the arm 32 can turn. The arm 32 is swept by the short arm 21 as the depending arm 19 and the extendable members thereon are pushed forwardly. The segment 16 has an arcuate portion 37 under which the indicating arm 32 operates. The indicating arm 32 has a slot 38 in its upper end and the portions on the opposite sides thereof are pointed for indicating purposes with respect to measuring marks or graduations 39 on the said arcuate portion 37.

The bottom of the slot 38 is recessed as indicated at 41 and receives a U-shaped spring element 42. Adjustable in the slot 38 is a spring pressed member 43 having a top arcuate edge 44 conforming to the under edge of the arcuate portion 37. The bottom edge of the member 43 is recessed as indicated at 45 to receive the opposite side of the spring 42.

Adjustably connected to the depending arm 19 are a set of members which can be articulated and extended downwardly and laterally to provide generally a foot receiving portion 47 against which the foot of a limb 48 is adapted to be pressed. As the reflex nerve in the region of the knee is struck the foot of the limb will move upwardly and take with it the articulated members connected to the depending arm 19 and the short arm 21 will sweep the indicating arm 32 to a position where it will be held by the spring pressed member 44 so that a permanent indication will be made on the arcuate portion of the segment. Once the reading has been recorded, the arm 32 can be moved back to the zero position.

The articulated members are locked together by a pin pivot 49 held in place by a spring 51. These members, as may be identified at 52, respectively have on their opposite ends depressed areas 53 that nest with one another and through which the pin 49 extends. With the members 52 swung so that they are longitudinally aligned, the sections which are depressed, as indicated at 53, will be nested with one another as shown in Fig. 6. These members can be angled at 90 degrees relative to one another so that they may extend to a position as shown in Fig. 5 in dot-dash lines. The same spring 51 will hold the members together by means of the rivet. The head of the rivet 49 can be provided with a knob 54. The articulated members 52 can accordingly be articulated to provide the foot portion assembly 47 at different elevations and to a different lateral extent.

By the supporting stand or sleeve members being telescopically adjustable the segment 16 can be elevated readily and easily to locate the segment at a good location for easy reading and the articulated members 52 can be adjusted to the different length of the limb being tested for reflex action.

While various changes may be made in the details of construction, it is to be understood that such changes shall be deemed to fall within the spirit and scope of the appended claims.

I claim:

1. A device for measuring the reflex action of humans, comprising a base, vertical supporting means extending upwardly from the base, a measuring segment connected to the upper end of the vertical supporting means, indicating means pivoted upon the segment, said segment having an arcuate portion over which the indicating means may be moved, operating means pivoted upon the segment and engageable with the indicating member and depending downwardly therefrom, said operating means being provided with a laterally extending portion engageable by a limb, whereby the operating means will be actuated as the reflex action of the limb is tested and an indication will be recorded upon the arcuate portion of the segment by the indicating means.

2. A device for measuring the reflex action of humans, comprising a base, vertical supporting means extending upwardly from the base, a measuring segment connected to the upper end of the vertical supporting means, indicating means pivoted upon the segment, said segment having an arcuate portion over which the indicating means may be moved, operating means pivoted upon the segment and engageable with the indicating member and depending-downwardly therefrom, said operating means provided with a laterally extending portion engageable by a limb, whereby the operating means will be actuated as the reflex action of the limb is tested and an indication will be recorded upon the arcuate portion of the segment by the indicating means, and said vertical supporting means comprising members vertically adjustable with respect to each other.

3. A device for measuring the reflex action of humans, comprising a base, vertical supporting means extending upwardly from the base, a measuring segment connected to the upper end of the vertical supporting means, indicating means pivoted upon the segment, said segment having an arcuate portion over which the indicating means may be moved, operating means pivoted upon the segment and engageable with the indicating member and depending downwardly therefrom, said operating means provided with a laterally extending portion engageable by a limb, whereby the operating means will be actuated as the reflex action of the limb is tested and an indication will be recorded upon the arcuate portion of the segment by the indicating means, and said operating means having depending articulated members whereby the length of the operating means may be varied.

4. A device for measuring the reflex action of humans, comprising a base, vertical supporting means extending upwardly from the base, a measuring segment connected to the upper end of the vertical supporting means, indicating means pivoted upon the segment, said segment having an arcuate portion over which the indicating means may be moved, operating means pivoted upon the segment and engageable with the indicating member and depending downwardly therefrom, said operating means being provided with a laterally extending portion engageable by a limb, whereby the operating means will be actuated as the reflex action of the limb is tested and an indication will be recorded upon the arcuate portion of the segment by the indicating means, said operating means comprising a short arm and a depending arm secured to each other, said short arm being engageable with the indicating means, said short arm, depending arm and indicating means having a common pivot therebetween, with a single pivot pin extending therebetween, and spring pressed means engaging with the arcuate section of the segment to hold the indicating means in a position to which it has been moved by the short arm.

5. A device for measuring the reflex action of humans, comprising a base, vertical supporting means extending upwardly from the base, a measuring segment connected to the upper end of the vertical supporting means, indicating means pivoted upon the segment, said segment having an arcuate portion over which the indicating means may be moved, operating means pivoted upon the segment and engageable with the indicating member and depending downwardly therefrom, said operating means being provided with a laterally extending portion engageable by a limb, whereby the operating means will be actuated as the reflex action of the limb is tested and an indication will be recorded upon the arcuate portion of the segment by the indicating means, and said vertical supporting means being adjustable to different heights and said operating means having depending articulated members operable to dispose the foot or limb engaging part of the articulated members at different distances from the pivot point of the segment.

6. A device for measuring the reflex action of humans comprising means adapted to be engaged by a human limb and to be moved by such limb during the reflex action thereof, indicating means connected to and movable in response to movements of said limb-engaging means, measuring means adapted to be traversed by said indicating means during movement thereof and means for adjustably supporting said limb-engaging means, indicating means and measuring means, whereby said device may be employed to measure the reflex action of limbs of different dimensions.

7. A device for measuring the reflex action of humans as defined by claim 6, in which said measuring means includes an open segment having an arcuate portion bearing measuring indicia and said indicating means moves in the opening of such segment and has terminal portions straddling said arcuate portion and serving as measurement indicators with respect to said indicia.

UGO TORRICELLI.

REFERENCES CITED

The following references are of record in the file of this patent:

FOREIGN PATENTS

| Number | Country | Date |
| --- | --- | --- |
| 44,018 | Austria | Sept. 10, 1910 |